Jan. 21, 1930.

F. W. KAUFMANN 1,744,228

CONTROL SYSTEM

Filed May 31, 1927

WITNESSES:
H. B. Funk
J. E. Dickinson

INVENTOR
Franklin W. Kaufmann
BY
Wesley G. Carr
ATTORNEY

Patented Jan. 21, 1930

1,744,228

UNITED STATES PATENT OFFICE

FRANKLIN W. KAUFMANN, OF PITTSBURGH, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed May 31, 1927. Serial No. 195,186.

My invention relates generally to control systems for motors and it has particular relation to control systems for laundry machine motors.

The object of my invention, generally stated, is to provide a control system for motors utilized in connection with rotary washing machines or apparatus of that type, which shall be simple to construct, convenient in operation and economically manufactured.

It is also an object of my invention to provide for stopping a rotary machine such as a washing machine in a predetermined position, thereby facilitating access to the machine or rendering the operation of the machine more efficient.

The accompanying drawing illustrates an embodiment of my invention which may be employed to control the operation of motors provided for driving rotary type laundry machines.

Figure 1:
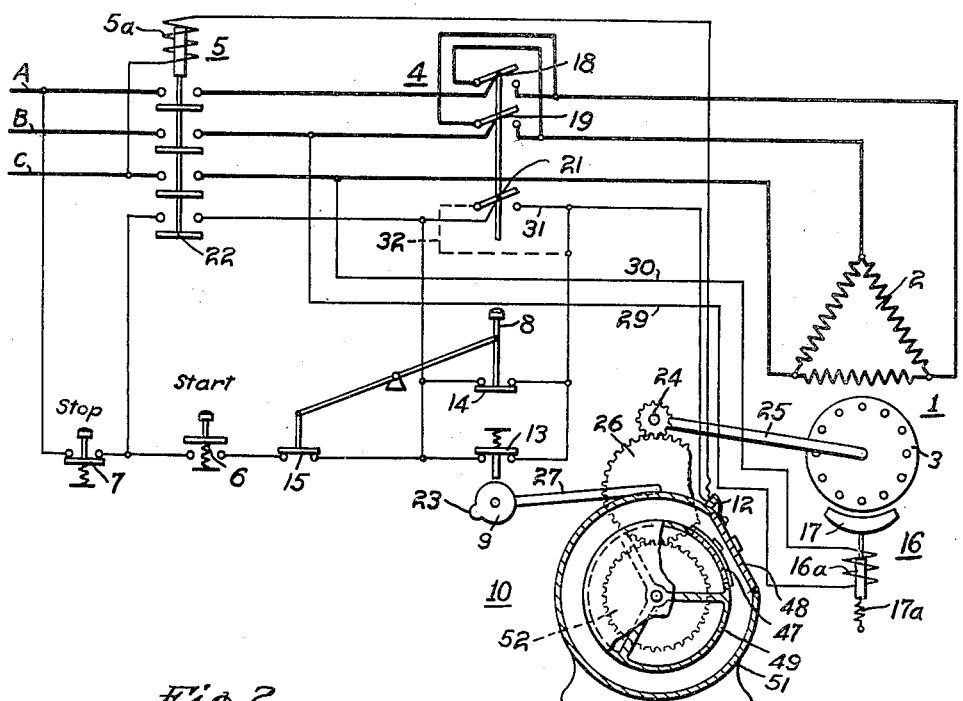
Figure 2:
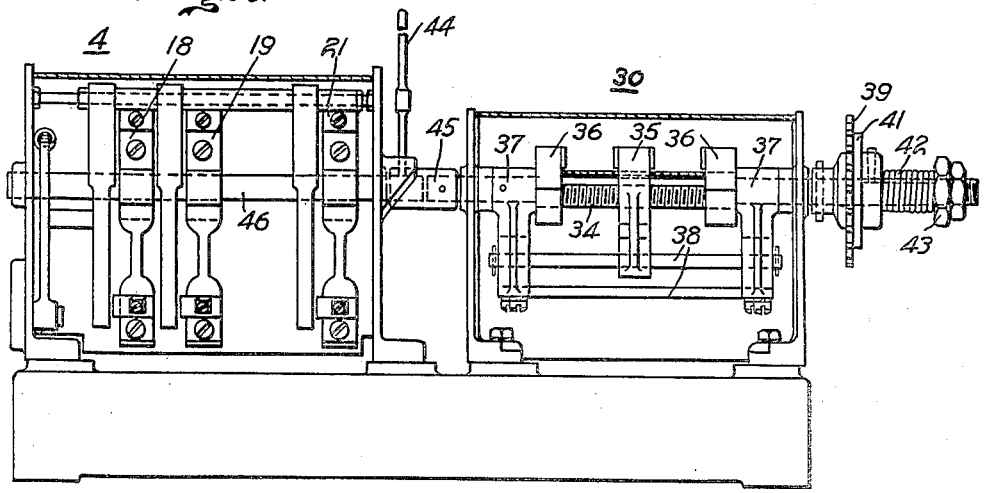

For a more complete understanding of the invention, reference may be had to the following detailed description taken in connection with the accompanying drawing, in which:

Figure 1 is a diagrammatic view of a control system constructed in accordance with my invention, and Fig. 2 is a view in side elevation of a reversing switch, with part of the housing removed to show the details of the structure.

Referring now to the drawing, and particularly to Fig. 1, a reversible type induction motor 1 is employed for driving a washing machine 10. The current for operating the motor 1 may be obtained from the supply conductors A, B and C. An electro-responsive main line contactor 5 is employed to control the flow of current from the main line conductors to the motor.

The starting and stopping respectively of the motor 1 and the washing machine 10 may be accomplished by the push button switches 6 and 7 that are provided in the control circuits which will be traced hereinafter. The intermittent reversal of the motor may be accomplished through the operation of a reversing switch 4, which may be connected in any suitable manner to operate in accordance with the motor, or driven machine and which will be more fully described hereinafter.

The stator 2 of the motor 1 is connected through the reversing switch 4 to the source of supply in such a manner that upon the operation of the reversing switch 4 the current in the stator 2 will be changed to cause the rotor 3 of the motor to change its direction of rotation. The main line conductors A and B are connected to two contact members 18 and 19 respectively which are provided on the reversing switch 4. The elements associated with these contactors and with which they engage are connected to two phases of the stator 2, as illustrated, and upon the alternate operation of the switch 4 these two-phase connections are reversed. The third line C of the supply is connected directly to one phase of the rotor 2.

To aid in retarding the rotation of the rotor 3 and thereby expedite the stopping of the washing machine 10, a brake 16 is provided. An armature 17 is provided on the brake 16 which may be held in its released position by a solenoid coil 16a energized from the source of power through conductors 29 and 30. The conductors 29 and 30 may be connected on the motor side of the main line contactors 5 to any two phases of the supply, being here illustrated as connected to conductors B and C. The brake shoe is biased into its braking position by means of a resilient member or spring 17a which holds the brake shoe in its braking position when the brake shoe actuating coil 16a is not energized.

The main line contactor 5 is of the multiple-pole magnetic type and may be employed to make and interrupt the motor circuit. The operation of the contactor may be effected by the actuating coil 5a, which is connected in a circuit, that will be traced hereinafter.

In the operation of laundry machines, such as the washing machine 10, it is desirable to be able to stop the washing machine with the doors 47 and 48 provided on the inner and outer drums 49 and 51 respectively, of the washing machine 10 in alignment. When the doors are stopped in alignment, access may be had to the machine to load or unload it without manually rotating the inner drum 49.

The automatic stopping of the machine as above suggested, is accomplished by a spotting system which effects the actuation of the main line contactor 5 to interrupt the circuit of the rotor 2 of the motor 1 when the spotting push button switch 8 is operated.

In this installation a spotting push button switch 8 is employed and as shown it is of the double action type and is illustrated as having a cross-arm pivotally mounted at its center with contact members 14 and 15 at either end. The contact members are disposed to be opened and closed upon the operation of the push button switch 8. A cam actuated push button switch 13 may be connected in parallel circuit relation with the contact member 14 and operated by a projection 23 on the cam 9, which may be rotated by the motor 1.

As shown, the cam 9 which is mounted on the shaft 27 is driven through a pair of gear wheels 24 and 26, which are respectively fastened to the armature shaft 25 of the motor 1, and the shaft 27. The gear wheel 26 also meshes with another gear wheel 52 to drive the washing machine, the gear wheel 52 being illustrated as connected to the inner drum 49. The contact member 13 is actuated to its open position when the projection 23 of the cam 9 comes into engagement therewith. The circuits for energizing the actuating coil 5a for operating the main line contractor 5 will now be traced.

Assuming that the contactor 5 is open and that the spotting push button switch 8 is closed, then in response to the closure of the starting switch 6 a circuit will be established from the line conductor C, through the actuating coil 5a, protecting devices 12 arranged on the doors of the washing machine, contact mmebers 14 and 15 of the spotting push botton switch 8, contact members of the starting push botton switch 6 and stopping switch 7 to a second main line conductor here designated, as conductor A. When the main line contactor 5 is actuated to its closed position, and the starting switch 6 which is biased to its normally open position is relased, a plurality of holding circuits for the actuating coil 5a are established. The holding circuits may be traced from one of the main line-conductors such as C through the coil 5a, the protective device 12 on the door 48 of the outer drum 51, and any one or all of the three contact members 21, 14 or 13, the interlock 22 of contactor 5, stopping switch 7 to the main line conductor A. In order to permit the spotting means to function the three contact members 13, 14 and 21 connected in parallel circuit relation in the holding circuit, must be interrupted. As will be noted the circuit through the contact member 21, may be interrupted only by the actuation of the reversing switch 4 to operate the motor in a predetermined direction. Therefore when contact member 21 is in its open circuit position and the spotting push button switch 8 has been depressed to thus disengage contact member 14, the holding circuit for coil 5a will be interrupted when the cam 9 causes the contact member 13 to open. In order to provide for automatically spotting the driven machine when the motor is rotating in the other direction, the only alteration to the system necessary is to disconnect the conductor 31 which is shown by full lines as connected to the contactor 21 of the reversing switch 4 and connect it as indicated by the dotted lines 32.

When it is desired to cause the motor to stop for emergency purposes, the stopping switch 7 which is biased to its closed position, may be opened to deenergize the actuating coil 5a and drop out the contactor 5. The opening of the main line contactor 5 will interrupt the motor circuit and the brake coil 16 will be deenergized. The deenergization of the brake coil 16 will permit the actuation of brake shoe 17 to quickly stop the machine after the line contactor 5 has opened.

In the regular operation of the motor and washing machine, it is desirable to cause the machine to stop automatically in a predetermined position. This operation may be obtained by first opening the spotting push button switch 8, which, as described hereinbefore, interrupts one of the three branches of the holding circuit for the coil 5a. The holding circuit for the coil 5a being maintained in the manner first described, may be interrupted only when the reversing switch 4 is thrown to the left, as shown, and the cam actuated contact member 13 is opened by the cam 9. The cam 9 may be set in any predetermined position to open the cam actuated switch 13 when the washing machine drum 49 is in any desired position with respect to the stationary drum 51.

Therefore, it will be readily understood that, so long as the spotting push-button switch 8, is maintained in the position shown to bridge the contact members 14 and 15, the operation of the reversing switch 4, or the cam-actuated switch 13, has no effect upon the holding circuit for the main-line contactor 5. It is only when the push-button switch 8 has been opened and the reversing switch 4 actuated to a predetermined position, that the opening of the cam-actuated switch 13 is effective to deenergize the holding circuit for the main-line contactor 5. As described hereinbefore, the position of the reversing switch 4 to render the cam-actuated switch 13 effective under these conditions, depends upon the manner in which the conductor 31 is connected to the switch. By changing the connection, as described, the washing-machine drum may be spotted when traveling in the forward or the reverse direction, which is a desirable feature in some instances.

In order to spot the machine in response to the operation of the cam-actuated switch 13, the switch-actuating cam 9, may be set so that it will open the switch 13 before the reversing switch 4 has been operated to establish a motor circuit in the opposite direction. In a spotting operation when the push-button switch 8 is open and the contact members 21 of the reversing switch 4 stand in position to open its branch of the holding circuit, then the actuating cam 9 actuates the switch 13 to the open position, and the main-line contactor 5 is deenergized, causing an interruption of the motor circuit.

As will be readily understood, the interruption of the motor circuit deenergizes the brake coil, and the revolving drum 49 is immediately stopped, with its door in registry with that in the stationary drum 51.

When the system is operating to perform an ordinary washing operation, the motor circuit is controlled exclusively by the reversing switch 4, and the main line contactor 5 remains closed. However, when a control operation is instituted to perform a spotting operation, the main-line contactor 5 is controlled entirely by the cam-actuated switch 13, which is actuated to effect the opening of the main-line contactor 5, before the reversing switch 4 is actuated.

In accordance with this control scheme, the motor cannot be restarted after it has been stopped, until the spotting push button switch 8, as well as the protective device 12 on the door 47, have been closed. It will be noted that the energizing circuit of coil 5a is not completed until contact member 15 and protective device 12 are closed.

The switch employed for automatically reversing the motor, may be of any suitable type but in this embodiment, a switch having a number of double acting contact elements 18, 19 and 21 is provided. The switch is actuated by a traveling nut which may be moved in any suitable manner by the motor or the driven machine.

Referring to Fig. 2, the traveling nut device shown generally at 33, comprises a threaded shaft 34 which in this embodiment of the invention may be rotated by either a chain drive (not shown) from the motor or from the driven machine. The shaft 34 may be rotated through the cooperation of the sprocket wheel 39 that is loosely mounted thereon and the friction clutch disk 41 which is biased into engagement therewith by the spring 42. The pressure exerted by the spring 42 on the clutch disk 41 may be adjusted by means of the locknut 43.

The travel of the nut 35 on the threaded shaft 34 may be limited in any suitable manner as by the provision of stops 36. As will be observed the stops 36 may be adjusted on shaft 34, to regulate the distance of travel of the nut 35, thereby regulating the number of revolutions that the driven machine will make in either direction. Two V-shaped elements 37 are mounted on the shaft 34 near its ends and carry a pair of guide members 38. These guide members are disposed in parallel relation with the main shaft 34 to receive the projections provided on the traveling nut 35, to prevent it from rotating with the shaft.

When the traveling nut 35 is caused to move into engagement with one or the other of the stops 36, it will through its engagement with one of the guide members 38 effect the actuation of the reversing switch, since the V-shaped elements 37 at the left end of shaft 34 is coupled to the shaft 46 on the reversing switch by means of a coupling 45. With each operation of the reversing switch, the direction of rotation of the motor is changed. The change in direction of rotation of the motor results in a corresponding change in direction of rotation of the threaded shaft 34 which causes the traveling nut 35 to move back and forth between the ends of the shaft 34, automatically tripping the reversing switch.

While I have shown a preferred form of my invention, it will be apparent that modifications may be made in the arrangement of circuits and apparatus employed without departing from the spirit of the invention, as set forth in the appended claims.

I claim as my invention:

1. The combination with an electric motor and a machine driven by the motor, of an automatic controller operated by the motor for intermittently changing the direction of rotation of said motor, and spotting means disposed to insure the stopping of the machine in a predetermined position when running in a predetermined direction.

2. In combination with an electric motor, and a machine driven by the motor, a control circuit comprising a source of current, a traveling-nut switch operated by the motor to automatically reverse its rotation at predetermined intervals, an electromagnetic contactor and manually operated means for controlling the operation of the same, further means responsive to the operation of said motor for insuring the stopping of the driven machine in some predetermined position.

3. In a control system comprising an electric motor and a machine driven by the motor, a traveling-nut switch responsive to the operation of the motor for automatically reversing the rotation of the motor, an electromagnetic line contactor, and a manually operated spotting device including means responsive to the operation of said motor to insure the stopping of the driven machine at a predetermined position.

4. In a control system for motor driven devices, an electric motor, manual means for starting and stopping the motor, a controller for reversing the motor to automatically cause the intermittent reversal of the driven device and means associated with said motor and said reversing controller for stopping the driven device at a predetermined position when rotating in one direction.

5. In a control system for a motor-driven device, an electric motor, manually operable means for starting and stopping the motor, a controller for reversing the motor at intervals to effect an intermittent reversal of the driven device, means associated with the motor for stopping the driven device in a predetermined position and means for rendering the stopping means inoperative when the motor is rotating in a predetermined direction.

6. The combination with a motor-driven device, an electric motor for driving the device and a reversing switch for causing the motor and device to oscillate, of control means for stopping the device at a predetermined position comprising an electromagnetic switch for closing the motor circuit, an actuating circuit for the switch, a contact member actuated by the reversing switch for closing the switch-actuating circuit when the motor rotates in a predetermined direction, a cam-actuated switch connected in parallel-circuit relation with the contact member to maintain the switch-actuating circuit closed except when the motor-driven device is in a predetermined position and a manually-operable switch connected in parallel-circuit relation with the cam-actuated switch for maintaining the switch-actuating circuit closed during normal operation of the motor-driven device.

7. In a control system for a motor-driven device, in combination, a motor, a source of power supply for the motor, a reversing switch interposed between the motor and the power source, means for actuating the reversing switch periodically, a line switch for connecting the motor to the power source, an actuating circuit for the line switch, a spotting switch, a cam-actuated switch operated in conjunction with the motor-driven device and an interlock carried by the reversing switch, said spotting switch, cam switch and interlock being connected in parallel-circuit relation in the line-switch-actuating circuit, whereby, upon the opening of the spotting switch, the line-switch-actuating circuit will be interrupted by the cam switch when the motor is rotating in a predetermined direction and the driven device is in a predetermined position.

8. In a control system for a motor-driven device, in combination, a motor, a source of power supply for the motor, a reversing switch interposed between the motor and the power source, means for actuating the reversing switch periodically, a line switch for connecting the motor to the power source, an actuating circuit for the line switch, said actuating circuit comprising an emergency stopping switch connected in series-circuit relation with a starting switch, an interlock on the contact device that is connected in parallel-circuit relation with the starting switch, a positioning device connected in series-circuit relation with the starting and stopping switches, the positioning device comprising a switch associated with the reversing mechanism, a cam-actuated switch and a manually-actuated switch, all connected in parallel-circuit relation in such manner that, when the manually actuated switch is opened, the motor will be stopped while operating in a predetermined direction only and at a predetermined position.

In testimony whereof, I have hereunto subscribed my name this 25th day of May, 1927.

FRANKLIN W. KAUFMANN.